United States Patent
Kittanakere-Naagaraj et al.

(10) Patent No.: US 11,299,306 B2
(45) Date of Patent: Apr. 12, 2022

(54) METHODS AND APPARATUSES FOR PACKAGING GLASS ARTICLES

(71) Applicant: CORNING INCORPORATED, Corning, NY (US)

(72) Inventors: Manu Chakravarthy Kittanakere-Naagaraj, Burlington, MA (US); Patrick Aaron Parks, Elmira, NY (US); John Robert Turner, Elmira, NY (US)

(73) Assignee: CORNING INCORPORATED, Corning, NY (US)

( * ) Notice: Subject to any disclaimer, the term of this patent is extended or adjusted under 35 U.S.C. 154(b) by 97 days.

(21) Appl. No.: 15/631,652

(22) Filed: Jun. 23, 2017

(65) Prior Publication Data

US 2017/0369194 A1    Dec. 28, 2017

Related U.S. Application Data

(60) Provisional application No. 62/353,939, filed on Jun. 23, 2016.

(51) Int. Cl.
*A61J 1/14*    (2006.01)
*A61J 3/00*    (2006.01)
(Continued)

(52) U.S. Cl.
CPC .............. *B65B 27/10* (2013.01); *A61J 1/1487* (2015.05); *A61J 3/00* (2013.01); *B65B 3/022* (2013.01);
(Continued)

(58) Field of Classification Search
CPC ....... B65B 19/00; B65B 19/34; B65G 57/005; B65G 57/18; B65G 57/186; B65G 1/0442; B65G 61/00; C03B 35/26; B29L 2023/22
(Continued)

(56) References Cited

U.S. PATENT DOCUMENTS 1,781,360 A * 11/1930 Armor ................... B65D 71/00
                                                                206/443
2,564,729 A *  8/1951 Shepard ................ B65D 5/503
                                                                206/419
(Continued)

FOREIGN PATENT DOCUMENTS

DE          10056422 A1    5/2002
DE    102006024072 A1   11/2007
(Continued)

OTHER PUBLICATIONS

International Search Report & Written Opinion dated Dec. 14, 2017, for PCT/US2017/039064 filed Jun. 23, 2017. pp. 1-16.
(Continued)

*Primary Examiner* — Thanh K Truong
*Assistant Examiner* — Patrick B Fry
(74) *Attorney, Agent, or Firm* — F. Brock Riggs

(57) ABSTRACT

A method of forming bundles of glass articles is provided. The method includes transporting individual glass articles to an insert building station using a conveying system. The glass articles are individually located within article receiving slots of a layer separation insert using the conveying system. Each slot of the layer separation insert receives a single glass article forming a glass article layer of side-by-side glass articles. Multiple glass article layers including layer separation inserts are stacked using the conveying system forming a bundle. The layer separation inserts provide a barrier between adjacent glass articles of each of the glass article layers to inhibit glass-to-glass contact.

19 Claims, 11 Drawing Sheets

(51) Int. Cl.
| | |
|---|---|
| *B65B 3/02* | (2006.01) |
| *B65B 9/20* | (2012.01) |
| *B65B 19/34* | (2006.01) |
| *B65B 27/10* | (2006.01) |
| *B65B 35/44* | (2006.01) |
| *B65B 35/50* | (2006.01) |
| *B65B 61/20* | (2006.01) |
| *B65G 57/00* | (2006.01) |
| *B65G 57/14* | (2006.01) |
| *B65G 57/18* | (2006.01) |
| *B65G 67/24* | (2006.01) |

(52) U.S. Cl.
CPC .............. *B65B 19/34* (2013.01); *B65B 35/44* (2013.01); *B65B 35/50* (2013.01); *B65B 61/207* (2013.01); *B65G 57/005* (2013.01); *B65G 57/14* (2013.01); *B65G 57/186* (2013.01); *B65G 67/24* (2013.01); *B65B 9/2049* (2013.01); *B65G 2201/0217* (2013.01); *B65G 2201/0276* (2013.01); *B65G 2207/42* (2013.01)

(58) Field of Classification Search
USPC .......... 53/444, 246, 251; 414/745.7; 198/431
See application file for complete search history.

(56) References Cited

U.S. PATENT DOCUMENTS

| | | | | |
|---|---|---|---|---|
| 2,568,769 | A * | 9/1951 | Shepard | B65D 5/503 206/419 |
| 2,838,173 | A * | 6/1958 | Emery | B65D 1/36 206/419 |
| 3,462,582 | A * | 8/1969 | Cines | B29B 13/024 219/388 |
| 3,572,005 | A * | 3/1971 | Allen | B65B 25/04 53/534 |
| 3,654,745 | A * | 4/1972 | Smith | B65B 5/024 53/444 |
| 3,662,512 | A * | 5/1972 | Zelnick | B65B 53/066 53/442 |
| 3,670,866 | A * | 6/1972 | Olivotto | B65G 47/248 198/377.02 |
| 3,708,084 | A * | 1/1973 | Bixler | B65D 5/503 217/26.5 |
| 3,926,299 | A * | 12/1975 | Bradley | B65G 1/0442 198/347.3 |
| 4,236,855 | A * | 12/1980 | Wagner | B65B 35/50 414/789.5 |
| 4,250,687 | A * | 2/1981 | Lueneberg | B65B 19/00 53/435 |
| 4,362,454 | A * | 12/1982 | Kripzak | B23Q 7/10 414/267 |
| 4,439,091 | A * | 3/1984 | Frias | E21B 19/15 175/85 |
| 4,541,762 | A * | 9/1985 | Tischler | B23Q 7/04 414/416.07 |
| 4,765,487 | A * | 8/1988 | Bliss | B65G 57/24 209/510 |
| 4,832,183 | A * | 5/1989 | Lapeyre | B65G 17/08 198/690.2 |
| 5,000,905 | A * | 3/1991 | Cox | B29C 49/04 264/532 |
| 5,180,277 | A * | 1/1993 | Pearce | B65B 5/068 414/416.04 |
| 5,207,727 | A * | 5/1993 | Pearce | B65B 5/068 206/443 |
| 5,769,601 | A * | 6/1998 | Agne | B65G 57/005 206/386 |
| 6,558,108 | B1 * | 5/2003 | Van Oord | B65B 61/207 206/386 |
| 6,606,841 | B1 * | 8/2003 | Germunson | B65B 5/068 294/27.1 |
| 7,311,199 | B2 * | 12/2007 | Vantilt | B65B 11/585 206/321 |
| 7,416,379 | B2 * | 8/2008 | Roesch | B65B 17/02 414/789.5 |
| 7,766,591 | B2 * | 8/2010 | Douglas | B65B 9/13 410/98 |
| 7,819,621 | B2 * | 10/2010 | Veit | B21D 43/006 414/730 |
| 8,538,885 | B2 | 9/2013 | Faith et al. | |
| 9,623,989 | B2 * | 4/2017 | Loevenich | B65B 5/06 |
| 9,926,147 | B2 * | 3/2018 | Kuhn | B65G 57/005 |
| 2012/0234714 | A1 * | 9/2012 | Arai | B65D 5/5057 206/420 |
| 2014/0245701 | A1 * | 9/2014 | Loevenich | B65B 5/06 53/443 |
| 2016/0221736 | A1 | 8/2016 | Hayashi et al. | |
| 2017/0073173 | A1 | 3/2017 | Kuhn et al. | |

FOREIGN PATENT DOCUMENTS

| | | |
|---|---|---|
| JP | S49112666 U | 9/1974 |
| JP | 49-112666 A | 10/1974 |
| JP | S5127672 U | 2/1976 |
| JP | 51-027672 A | 3/1976 |
| JP | 54-016296 A | 2/1979 |
| JP | S5416296 A | 2/1979 |
| JP | 61-273314 A | 12/1986 |
| JP | S61273314 A | 12/1986 |
| JP | 63-248626 A | 10/1988 |
| JP | S63248626 A | 10/1988 |
| JP | 09-295686 A | 11/1997 |
| JP | H09295686 A | 11/1997 |
| JP | 10-006257 A | 1/1998 |
| JP | H106257 A | 1/1998 |
| JP | 10-194456 A | 7/1998 |
| JP | H10194456 A | 7/1998 |
| JP | 2009-292642 A | 12/2009 |
| JP | 2009292642 A | 12/2009 |
| JP | 5127672 B2 | 1/2013 |
| JP | 2015-054723 A | 3/2015 |
| WO | 2014209833 A1 | 12/2014 |
| WO | 2015128452 A1 | 9/2015 |

OTHER PUBLICATIONS

European Communication Pursuant to Article 94(3) EPC dated Nov. 19, 2019, for EP Patent Application No. 17739775.9. pp. 1-3.
Japanese Patent Application No. 2018-551918 Office Action dated Sep. 17, 2021, 9 pages (4 pages of English Translation and 5 pages of Original Document); Japanese Patent Office.
Japanese 1st Office Action & Search Report dated Jun. 2, 2021 for JP Patent Application No. 2018-551918. pp. 1-9.
Japanese Decision of Rejection & Search Report dated Sep. 29, 2021 for JP Patent Application No. 2018-551918. pp. 1-9.
Japanese Patent Application No. 2018-551918, Office Action dated May 21, 2021, 9 pages (4 pages of English Translation and 5 pages of Original Document), Japanese Patent Office.

* cited by examiner

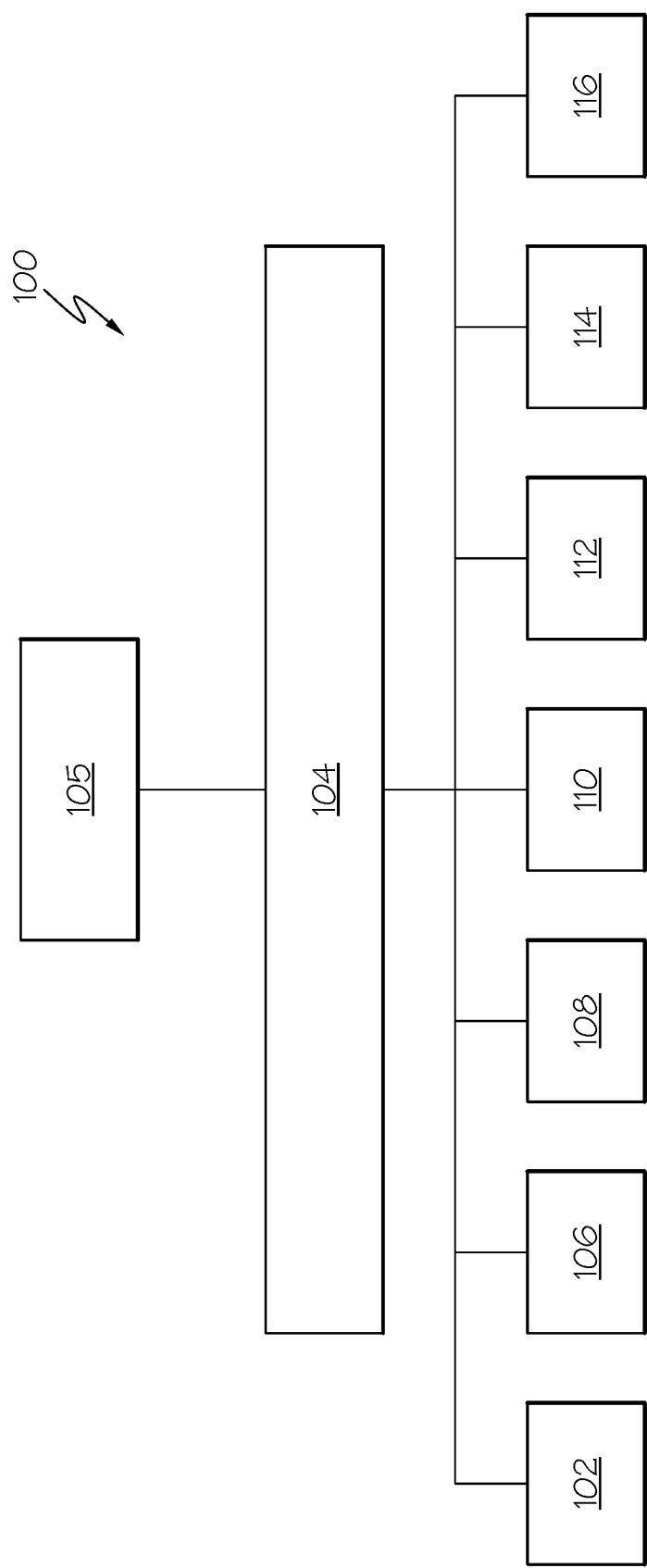

ized package formed of stacked bundles of glass articles, according to one or more embodiments shown and described herein;

METHODS AND APPARATUSES FOR PACKAGING GLASS ARTICLES

CROSS REFERENCE TO RELATED APPLICATIONS

The present application claims priority to U.S. Provisional Application No. 62/353,939 filed Jun. 23, 2016, entitled, "Methods and Apparatuses for Packaging Glass Articles," the entirety of which is incorporated by reference herein.

BACKGROUND

Field

The present specification generally relates to methods and apparatuses for packaging glass articles and, more particularly, to methods and apparatuses for packaging glass articles, such as tubes for pharmaceutical packages that reduce or even eliminate glass-to-glass interactions during the packaging process.

Technical Background

Historically, glass has been used as the preferred material for packaging pharmaceuticals because of its hermeticity, optical clarity, and excellent chemical durability relative to other materials. Specifically, the glass used in pharmaceutical packaging must have adequate chemical durability so as not to affect the stability of the pharmaceutical compositions contained therein. Glasses having suitable chemical durability include those glass compositions within the ASTM standard 'Type 1B' which have a proven history of chemical durability.

However, use of glass for such applications is limited by the mechanical performance of the glass. In the pharmaceutical industry, glass breakage is a safety concern for the end user, as the broken package and/or the contents of the package may injure the end user. Further, non-catastrophic breakage (i.e., when the glass cracks but does not break) may cause the contents to lose their sterility which, in turn, may result in costly product recalls.

Specifically, handling or bundling of glass articles throughout the pharmaceutical package producing process can result in significant glass-to-glass contact, which can create scratches and defects in the glass. This mechanical damage can significantly decrease the strength of the glass pharmaceutical package resulting in an increased likelihood that cracks will develop in the glass, potentially compromising the sterility of the pharmaceutical contained in the package or causing the complete failure of the package. Reducing or even eliminating glass-to-glass contact can result in significant improvements in physical properties of the pharmaceutical packages.

Accordingly, a need exists for methods and apparatuses for packaging glass articles, such as tubes for pharmaceutical packages that reduce or even eliminate glass-to-glass interactions during the packaging process.

SUMMARY

According to one embodiment, a method of forming bundles of glass articles is provided. The method includes transporting individual glass articles to an insert building station using a conveying system. The glass articles are individually located within article receiving slots of a layer separation insert using the conveying system. Each slot of the layer separation insert receives a single glass article forming a glass article layer of side-by-side glass articles. Multiple glass article layers that include layer separation inserts are stacked using the conveying system forming a bundle. The layer separation inserts provide a barrier between adjacent glass articles of each of the glass article layers.

In another embodiment, an apparatus that forms bundles of glass articles includes a glass article infeed station that provides glass articles to a conveying system. The conveying system transports individual glass articles to an insert building station. An insert feed station includes a plurality of layer separation inserts. The conveying system transports the plurality of layer separation inserts to the insert building station. The conveying system individually locates the glass articles within article receiving slots of the plurality of layer separation inserts. Each slot of the plurality of layer separation inserts receives a single glass article to form a glass article layer of side-by-side glass articles. A bundle building station where the conveying system stacks multiple glass article layers include layer separation inserts that form a bundle. The layer separation inserts provide a barrier between adjacent glass articles of each of the glass article layers.

In yet another embodiment, a method of forming a palletized package of bundles of glass articles is provided. The method includes building multiple glass article layers using a conveying system by individually locating the glass articles within article receiving slots of multiple layer separation inserts. The multiple glass article layers that include layer separation inserts are stacked using the conveying system forming multiple bundles. The layer separation inserts provide a barrier between adjacent glass articles of each of the glass article layers. The multiple bundles are stacked to form the palletized package.

Additional features and advantages of the glass articles and methods and processes for manufacturing the same will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

BRIEF DESCRIPTION OF THE DRAWINGS

FIG. 5 illustrates an automatic packaging method and apparatus for forming the multiple bundles that are stacked to form the palletized package of FIG. 1, according to one or more embodiments shown and described herein;

DETAILED DESCRIPTION

Reference will now be made in detail to various embodiments of methods and apparatuses for packaging glass articles, such as tubes for pharmaceutical packages that reduce or even eliminate glass-to-glass interactions during the packaging process, examples of which are depicted in the figures. The glass articles may be further processed and, for example, used as glass containers suitable for use in various packaging applications including, without limitation, as pharmaceutical packages. These pharmaceutical packages may or may not contain a pharmaceutical composition. Various embodiments of the methods and apparatuses for packaging glass articles that reduce or even eliminate glass-to-glass interactions during the packaging process will be described in further detail herein with specific reference to the appended drawings.

Generally, the methods and apparatuses may utilize glass receiving inserts that are suitable for touching and supporting the glass articles. The glass receiving inserts may include individual slots that are sized and arranged to receive individual glass articles to form a layer of the glass articles. The layers of the glass articles can be stacked, one on top of the other with their glass receiving inserts which can then provide separation barriers between the layers of the glass articles and also between adjacent glass articles of the same layer. As will be described in greater detail below, the methods and apparatuses can also provide for automated packaging of the glass articles using the glass receiving inserts to reduce or even eliminate human handling of the glass articles during the packaging process.

Figure 1:
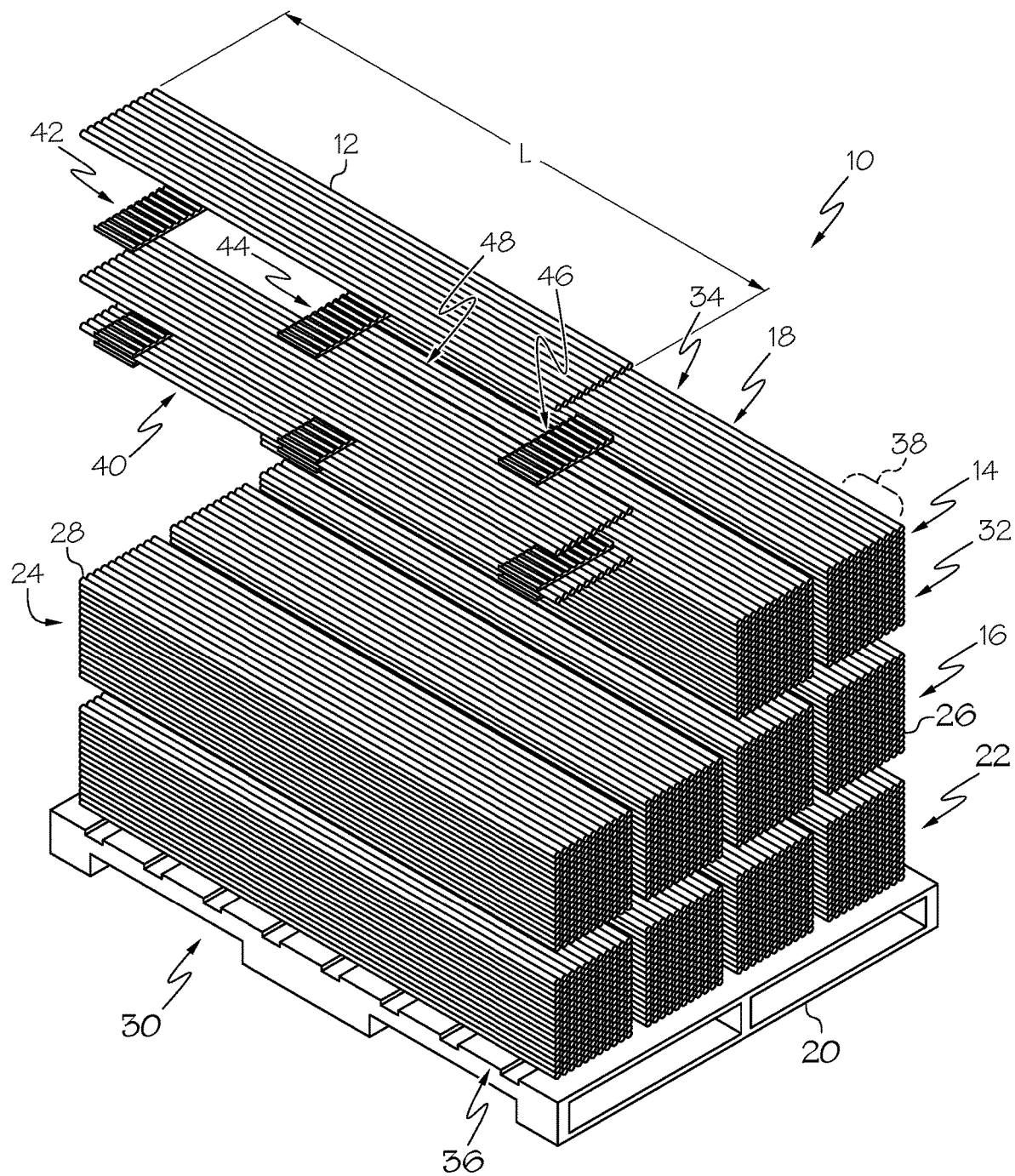
FIG. 1 is a perspective, partially exploded view of a palletized package formed of stacked bundles of glass articles, according to one or more embodiments shown and described herein.

Referring to FIG. 1, a palletized package 10 of multiple glass articles 12 in the form of individual tubes is illustrated. The palletized package 10 is formed of multiple bundles 14 of the glass articles 12 stacked in both rows 16 and columns 18 on a pallet 20. The palletized package 10 includes opposite ends 22 and 24 at which ends 26 and 28 of the glass articles 12 are arranged, opposite sides 30 and 32 that extend between the ends 26 and 28, a top 34 and a bottom 36 that rests on the pallet 20. In some embodiments, the palletized package 10 and/or the multiple bundles 14 may be wrapped in an outer wrap (represented by the dotted line 38), such as a plastic film (e.g., a shrink wrap, stretch wrap, etc.). Wrapping the palletized package 10 with the outer wrap 38 can increase rigidity and structural integrity to the overall palletized package 10 by securing the bundles together.

As shown by the exploded portion of FIG. 1, the bundles 14 are each formed by glass article layers 40 stacked one over another. Each glass article layer 40 may be formed of any suitable number of the glass articles 12, such as four, six, eight, 10, 12, 14, 18, 20 glass articles, arranged side-by-side. The number of the glass articles 12 in each layer may depend on, for example, the properties of the glass articles, such as size, weight, etc. The glass article layers 40 may be relatively long in length L (e.g., about one meter or more, such as about 1.5 meters or more) and relatively short in height H (e.g., a diameter of the glass article tubes).

Layer separation inserts 42, 44 and 46 are provided between each of the glass article layers. Layer separation inserts 42 and 46 may be end layer separation inserts and layer separation insert 44 may be a middle layer separation insert. The end layer separation inserts 42 and 46 may be located near the opposite ends 26 and 28 with the middle layer separation insert 44 located therebetween. As can be seen, the layer separation inserts 42, 44 and 46 may be shorter than the length L of the glass article layers 40 and may be separated from each other along the length L providing gaps 48 between adjacent glass article layers 40. Such an arrangement can reduce material used to form the layer separation inserts 42, 44 and 46 compared to longer layer separation inserts, while still separating the glass article layers 40 from each other.

Figure 2A:
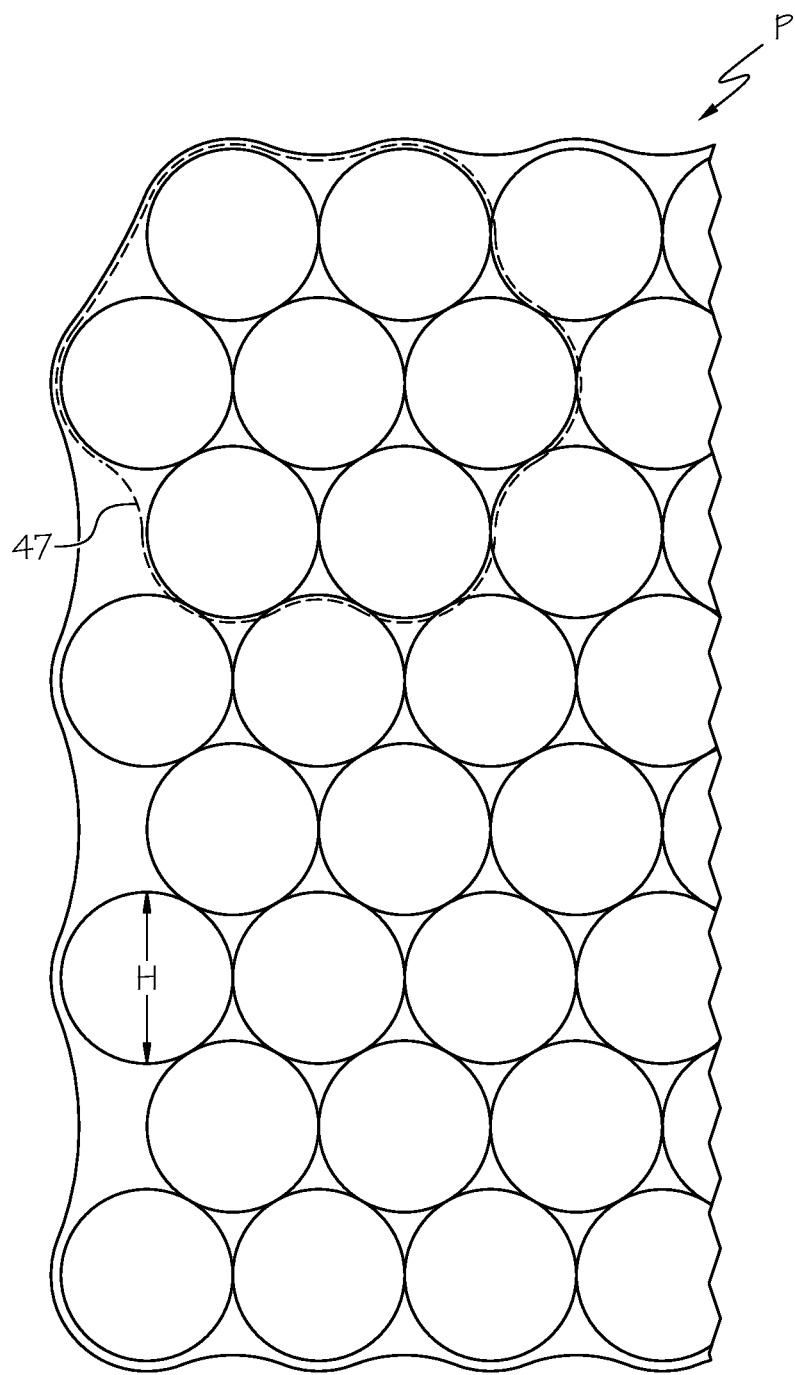
FIG. 2A is a detail end view of a bundle for use in forming a palletized package without separation between adjacent glass articles.

FIG. 2A illustrates a detail end view of glass article layers stacked one over another in a known configuration where the glass articles contact. The glass article layers are stacked in an offset configuration (e.g., offset a half diameter in the side-to-side or widthwise direction) that form hexagonal patterns (highlighted by dotted lines 47) of the glass articles 12. Such an arrangement results in significant glass-to-glass contact which can cause scratches and other mechanical damage to the glass articles.

Figure 2B:
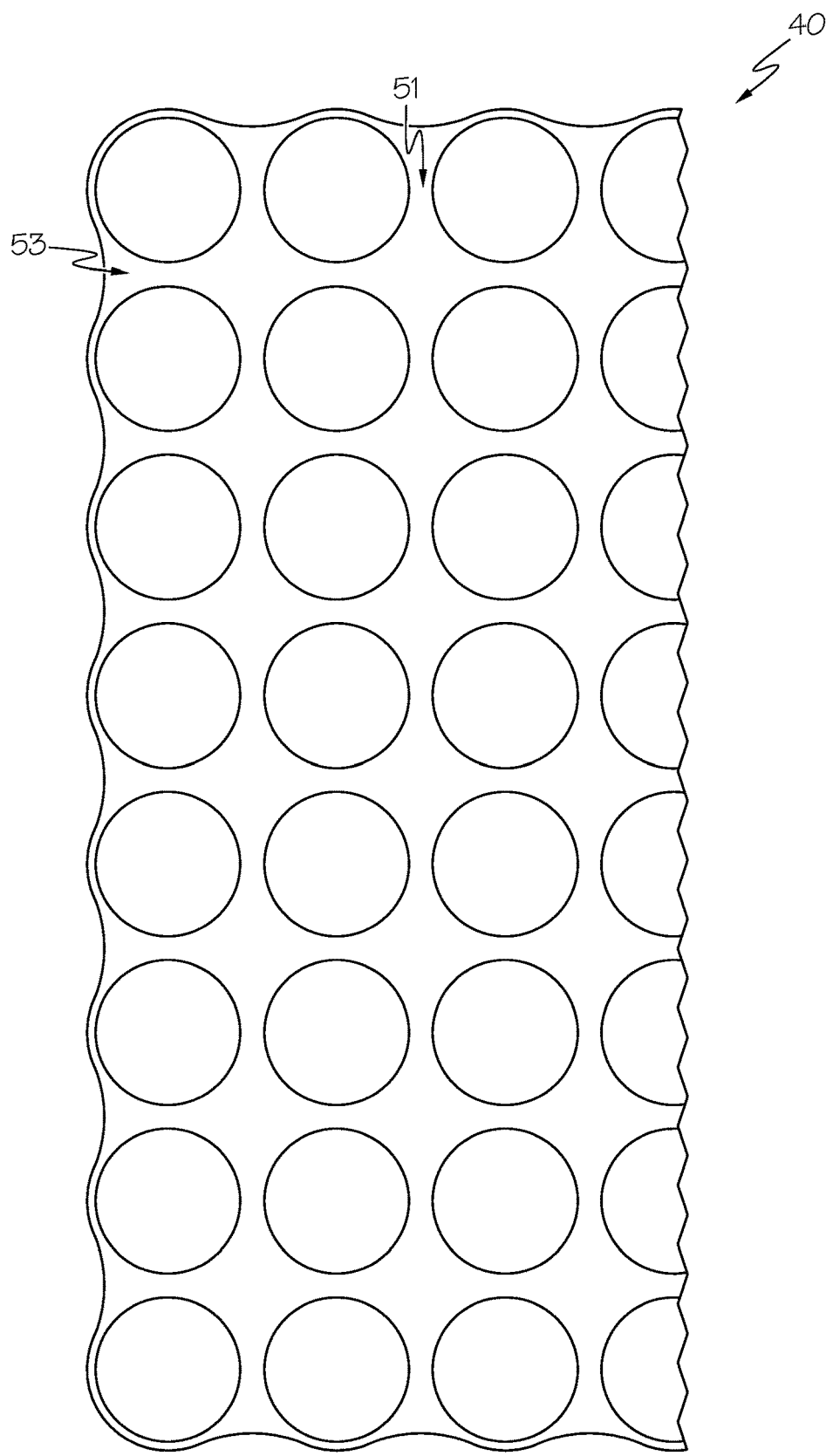
FIG. 2B is a detail view of the palletized package of FIG. 1 formed of multiple glass article layers illustrating separation between adjacent glass articles, according to one or more embodiments shown and described herein.

Referring to FIG. 2B, the layer separation inserts 42, 44 and 46 (FIG. 1) separate the individual glass articles 12 from one another in both the heightwise and widthwise directions.

In other words, the glass articles 12 are separated from one another between both rows and within each glass article layer 40 by the layer separation inserts 42, 44 and 46. As can be seen, gaps 51 are provided between adjacent glass articles 12 of the glass layers 40 and gaps 53 are provided between adjacent glass articles 12 of adjacent glass layers 40.

Figure 3:
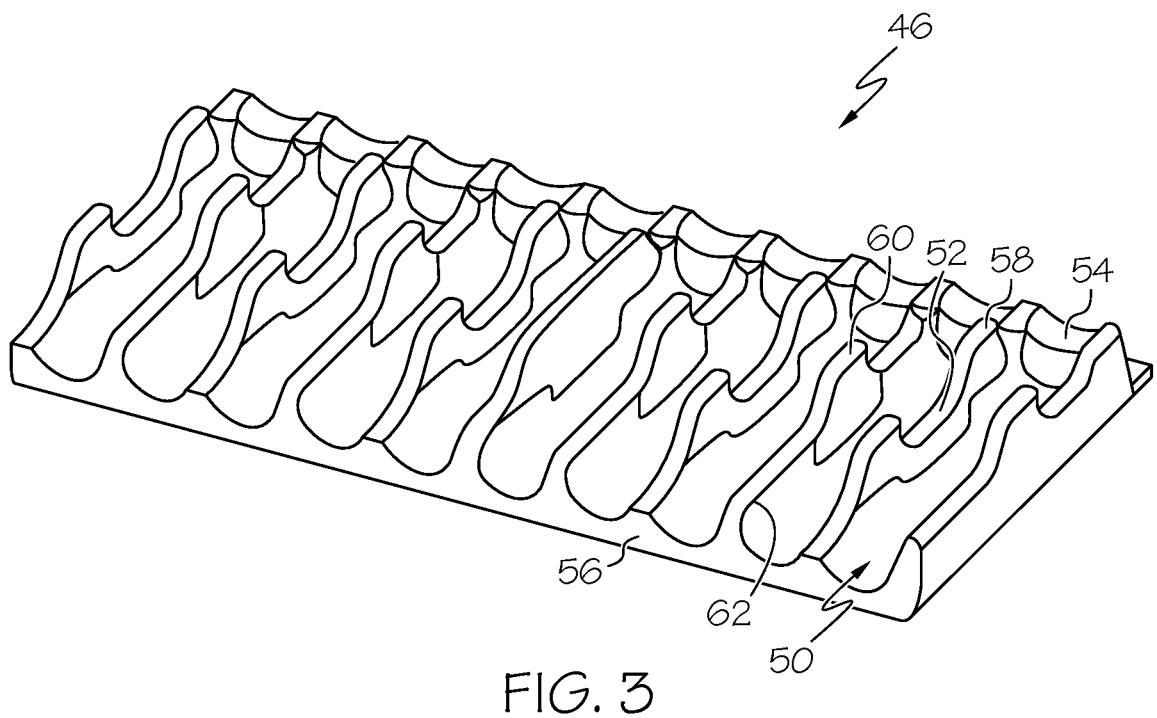
FIG. 3 is a perspective view of a layer separation insert for use in separating the glass articles of a bundle, according to one or more embodiments shown and described herein.

Referring to FIG. 3, the end layer separation insert 46 is illustrated. While the end layer separation insert 46 is shown, the end layer separation insert 42 may include the same or similar features suitable for the opposite ends 28. The end layer separation insert 46 includes a row of article receiving slots 50 that are each sized to receive the ends 28 of the glass articles 12 therein. The slots 50 may have a shape (e.g., round) that is complementary with an outer shape of the glass articles 12 to allow the glass articles 12 to nest within the article receiving slots 50. Each article receiving slot 50 includes a side wall 52 that extends along a length of the article receiving slot 50 to an end protection feature 54. The side walls 52 and end protection feature 54 extend outwardly from a continuous base 56 that extends along each of the article receiving slots 50. Height extension tabs 58 and 60 may extend outwardly from top edges 62 of the side walls 52. The height extension tabs 58 and 60 may be provided to extend outwardly beyond the glass articles 12 when provided in the article receiving slots 50 and to contact a base 56 of an adjacent end layer separation insert 46 thereby supporting at least some downward load. Contact between the height extension tabs 58, 60 and the base 56 of an adjacent end separation insert 46 can provide the spacing between the adjacent glass layers 40. The height extension tabs 58 may be offset from the height extension tabs 60 in the end-to-end or lengthwise direction, which can provide increased stability for the glass article layers 40 when stacked. The end protection features 54 can cover at least a portion of an end of the article receiving slots 50 to protect the end 26 of the glass articles 12. An opposite end of the article receiving slots 50 is open and unobstructed to allow the glass articles 12 to extend out of the article receiving slots 50 in a horizontal fashion.

Figure 4:
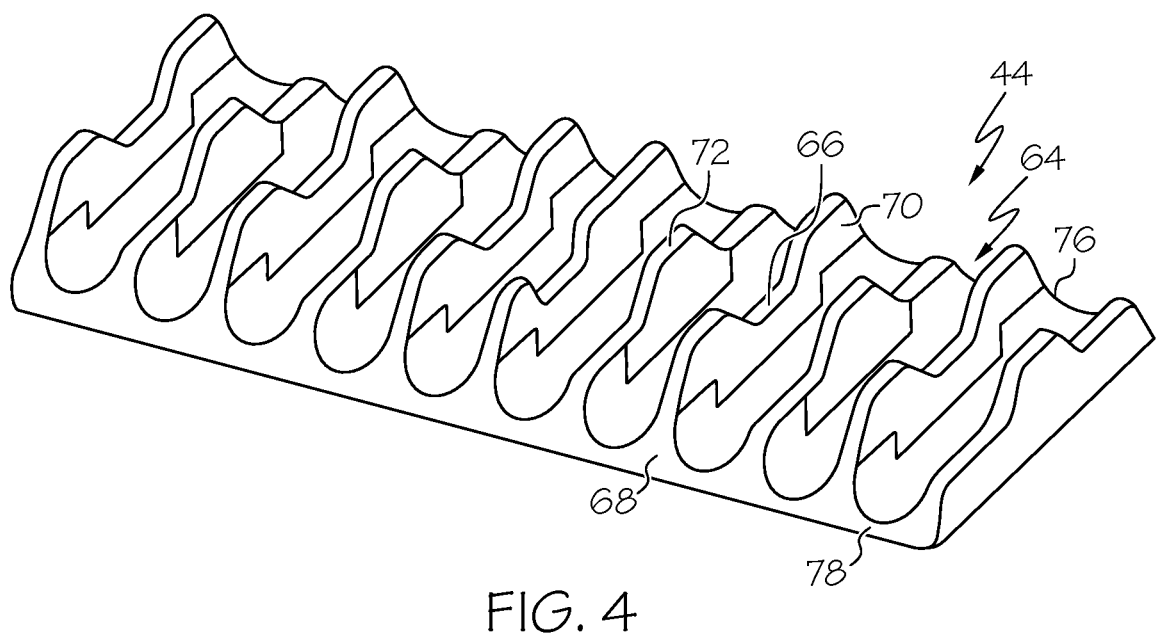
FIG. 4 is a perspective view of another layer separation insert for use in separating the glass articles of a bundle, according to one or more embodiments shown and described herein.

Referring to FIG. 4, similar to the end layer separation insert 46, the middle layer separation insert 44 includes a row of article receiving slots 64 that are each sized to receive a middle portion of the glass articles 12 therein. Again, the article receiving slots 64 may have a shape (e.g., round) that is complementary with the outer shape of the glass articles 12 to allow the glass articles 12 to nest within the article receiving slots 64. Each article receiving slot 64 includes a side wall 66 that extends along a length of the article receiving slot 64. The side walls 66 extend outwardly from a continuous base 68 that extends along each of the article receiving slots 64. Height extension tabs 70 and 72 may extend outwardly from top edges 74 of the side walls 66. The height extension tabs 70 and 72 may be provided to extend outwardly beyond the glass articles 12 when provided in the article receiving slots 64, as described above. For the middle layer separation insert 44, opposite ends 76 and 78 of the article receiving slots 64 are open and unobstructed to allow the glass articles 12 to extend out of the article receiving slots 64 in opposite directions in a horizontal fashion.

The layer separation inserts 42, 44 and 46 may be formed of any suitable material, such as amorphous polyethylene terephthalate (APET), silicone, etc. that can contact and protect the glass articles 12, while providing the desired separation between the glass article layers 40 (FIG. 2B). Any suitable process may be used to form the layer separation inserts 42, 44 and 46, such as molding.

The glass articles 12 may be formed from a variety of different glass compositions. The specific composition of the glass article may be selected according to the specific application such that the glass has a desired set of physical properties.

The glass articles 12 may be formed from a glass composition which has a coefficient of thermal expansion in the range from about $25 \times 10^{-7}/°$ C. to $80 \times 10^{-7}/°$ C. For example, in some embodiments described herein, the glass articles 12 are formed from alkali aluminosilicate glass compositions which are amenable to strengthening by ion exchange. Such compositions generally include a combination of $SiO_2$, $Al_2O_3$, at least one alkaline earth oxide, and one or more alkali oxides, such as $Na_2O$ and/or $K_2O$. In some of these embodiments, the glass composition may be free from boron and compounds containing boron. In some other embodiments, the glass compositions may further comprise minor amounts of one or more additional oxides such as, for example, $SnO_2$, $ZrO_2$, $ZnO$, $TiO_2$, $As_2O_3$, or the like. These components may be added as fining agents and/or to further enhance the chemical durability of the glass composition. In another embodiment, the glass surface may comprise a metal oxide coating comprising $SnO_2$, $ZrO_2$, $ZnO$, $TiO_2$, $As_2O_3$, or the like In one particularly exemplary embodiment, the glass articles 12 may be formed from an ion exchangeable glass composition described in pending U.S. patent application Ser. No. 13/660,894 filed Oct. 25, 2012 and entitled "Glass Compositions with Improved Chemical and Mechanical Durability" assigned to Corning, Incorporated.

However, it should be understood that the articles 12 described herein may be formed from other glass compositions including, without limitation, ion-exchangeable glass compositions and non-ion exchangeable glass compositions. For example, in some embodiments the glass container may be formed from Type 1B glass compositions such as, for example, Schott Type 1B aluminosilicate glass.

In some embodiments described herein, the glass articles 12 may be formed from a glass composition which meets the criteria for pharmaceutical glasses described by regulatory agencies such as the USP (United States Pharmacopoeia), the EP (European Pharmacopeia), and the JP (Japanese Pharmacopeia) based on their hydrolytic resistance. Per USP 660 and EP 7, borosilicate glasses meet the Type I criteria and are routinely used for parenteral packaging. Examples of borosilicate glass include, but not limited to Corning® Pyrex® 7740, 7800 and Wheaton 180, 200, and 400, Schott Duran, Schott Fiolax, KIMAX® N-51A, Gerrescheimer GX-51 Flint and others. Soda-lime glass meets the Type III criteria and is acceptable in packaging of dry powders which are subsequently dissolved to make solutions or buffers. Type III glasses are also suitable for packaging liquid formulations that prove to be insensitive to alkali. Examples of Type III soda lime glass include Wheaton 800 and 900. De-alkalized soda-lime glasses have higher levels of sodium hydroxide and calcium oxide and meet the Type II criteria. These glasses are less resistant to leaching than Type I glasses but more resistant than Type III glasses. Type II glasses can be used for products that remain below a pH of 7 for their shelf life. Examples include ammonium sulfate treated soda lime glasses. These pharmaceutical glasses have varied chemical compositions and have a coefficient of linear thermal expansion (CTE) in the range of $20-85 \times 10^{-7}/°$ $C.^{-1}$.

Referring to FIG. 5, an automatic packing method and apparatus 100 is illustrated for forming the multiple bundles 14 that are stacked to form the palletized package 10 of FIG.

1. The packing apparatus 100 includes a glass article infeed station 102 where individual glass articles 12 are provided to a conveying system 104 (e.g., using a conveyor or other transport mechanism) that separates and/or maintains separation of the glass articles 12 and feeds the glass articles 12 to an insert building station 106. A control unit 105 may include a processor and machine readable instructions providing logic to control operation of various components of the apparatus 100 including the conveying system 104. At the insert building station 106, the end layer separation inserts 42 and 46 and the middle layer separation insert 44 may be received from an insert infeed station 108 using the conveying system 104. As the layer separation inserts 42, 44, 46 are fed through the insert building station 106, the glass articles 12 may be placed (e.g., one by one) in the article receiving slots 50, 64 (FIGS. 3 and 4) of each of the end layer separation inserts 42 and 46 and the middle layer separation insert 44. Sensors may be used to provide a signal to the control unit 105 if any of the slots 50, 64 remain unfilled.

Once the layer separation inserts 42, 44 and 46 are filled, the glass article layer 40 is provided. The glass article layer 40 may be moved using the conveying system 104 (e.g., by a robotic arm or other transport mechanism) to a bundle building station 110. At the bundle building station 110, the glass article layers 40 may be stacked by the conveying system 104, one on top of the other to form the bundle 14 (FIG. 1). The bundle 14 of the stacked glass article layers 40 may then be transported by the conveying system 104 to a film supply and seal station 112, where the bundle 14 may be wrapped in a plastic film (e.g., a shrink or stretch wrap) and the plastic film sealed (e.g., using an adhesive and/or heat sealed). In some embodiments, the wrapped bundle 14 may be transported to a heating station 114, where the plastic film may be heated, for example, for a shrink operation.

Figure 6A:
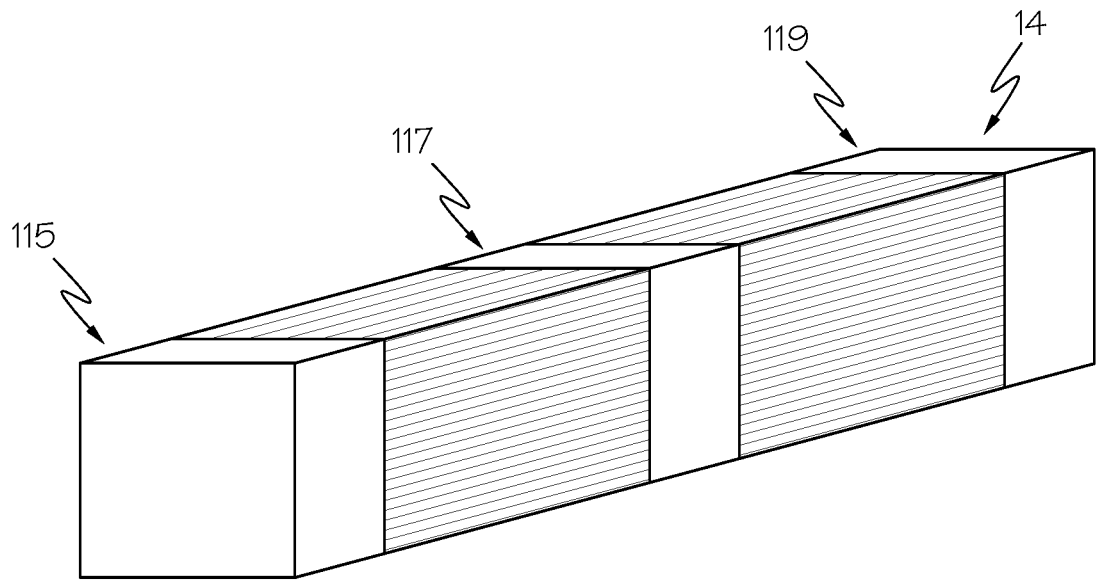
FIG. 6A illustrates a bundle of glass articles having a wrapped configuration, according to one or more embodiments shown and described herein.
Figure 6B:
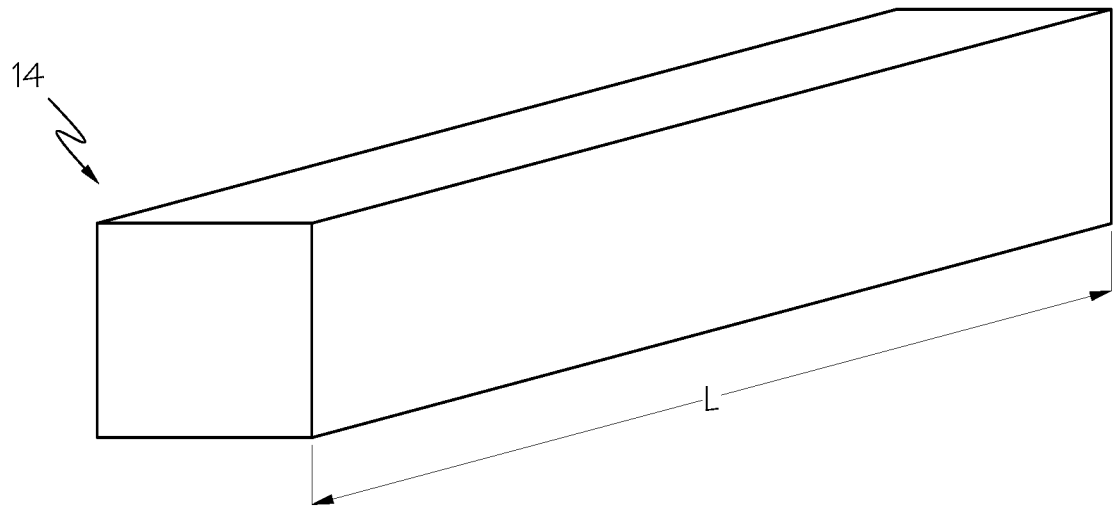
FIG. 6B illustrates a bundle of glass articles having another wrapped configuration, according to one or more embodiments shown and described herein.

In some embodiments, the bundle 14 may be wrapped at only certain locations. Referring briefly to FIG. 6A, for example, the bundle 14 may be wrapped at locations 115, 117 and 119 around the layer separation inserts (42, 44 and 46). In FIG. 6B, the bundle 14 may be wrapped about a majority of its periphery, such as continuously over its entire length L. Once the bundles 14 are wrapped, they may be transported (e.g., conveyed or other suitable transport mechanism) to a palletized package building station 116 (FIG. 5).

Figures 7, 9:
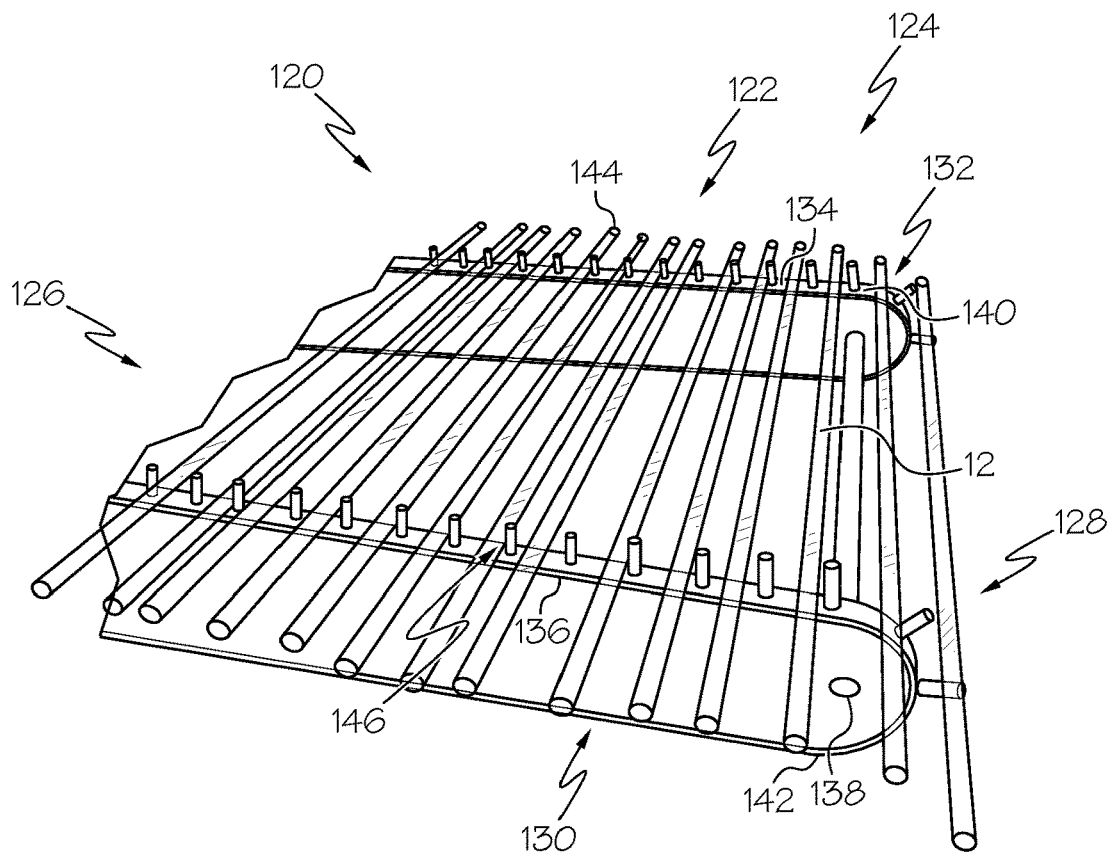
FIG. 7 illustrates a conveying system and glass infeed station of a packaging apparatus for forming bundles of glass articles, according to one or more embodiments shown and described herein.
FIG. 9 illustrates an insert building station of the packaging apparatus of FIG. 7, according to one or more embodiments shown and described herein.

Instead or in addition to wrapping, the bundles may be packaged in a shipping container, such as a box. FIGS. 7-14 illustrate a method and apparatus 120 that is similar to the method and apparatus of FIG. 5, where bundles are boxed in a shipping container. Referring first to FIG. 7, a conveyor 122 of a conveying system 124 transports individual glass articles 12 from a glass infeed station 126 to an insert building station 128. The conveyor 122, in this embodiment, includes a first conveying track assembly 130 and a second conveying track assembly 132 that is spaced-from the first conveying track assembly 130 in a cross-conveying direction suitable to support the glass articles 12 in the illustrated horizontal orientations. Each first and second conveying track assembly 130 and 132 includes a continuous conveyor belt 134 and 136 that is trained around head pulleys 138 and 140. One or more motors 142 may be used to drive the head pulleys 138 and 140 simultaneously at substantially the same rate. Article retaining projections 144 may be provided on both of the conveyor belts 134 and 136. Adjacent ones of the article retaining projections 144 may provide sectioned article retaining regions 146 that maintain spacing between adjacent glass articles 12 as the travel along the conveyor 122 in a conveying direction toward the insert building station 128.

Figure 8:
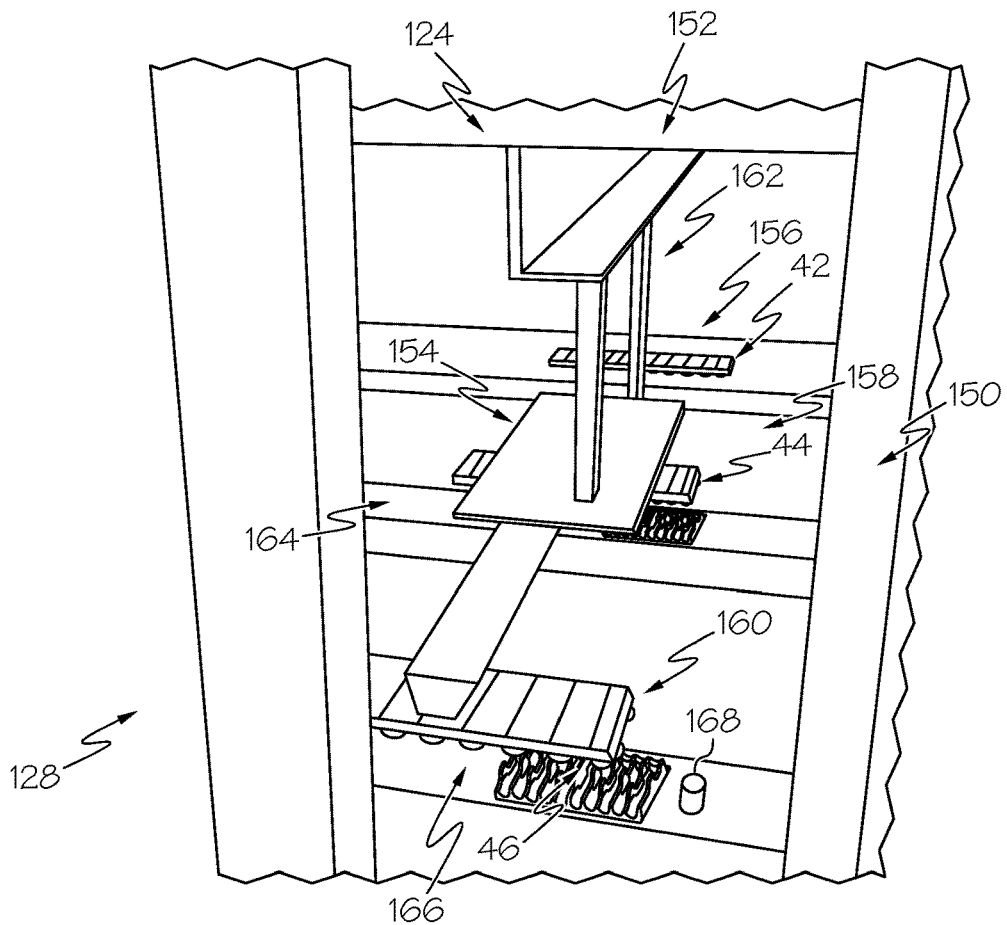
FIG. 8 illustrates an insert infeed station of the packaging apparatus of FIG. 7, according to one or more embodiments shown and described herein.

Referring to FIG. 8, an insert infeed station 150 is illustrated where the layer separation inserts 42, 44 and 46 are transported to the insert building station 128 (FIG. 7). In this embodiment, a robotic lift assembly 152 of the conveying system 124 includes an arm 154 and three spaced-apart retaining features 156, 158 and 160 are located to grasp and move the layer separation inserts 42, 44 and 46 to three conveying areas 162, 164 and 166. These conveying areas 162, 164 and 166 correspond to the ends and middle regions of the glass article layers 40 where the layer separation inserts 42, 44 and 46 reside. Insert pushers 168 (e.g., belt-driven, actuator-driven) may be provided at each of the areas 162, 164 and 166 that can push the layer separation inserts 42, 44 and 46 toward the insert building station 128.

Referring to FIG. 9, the glass articles 12 may be delivered to an article positioning guide 170 that receives the ends 26 and 28 of the glass articles 12 and guides the glass articles 12 to the article receiving slots 50, 64. The glass articles 12 may be released from the retaining projections 144 as they move around the head pulleys 138 and 140. As mentioned above, sensors may be provided to detect if a glass article 12 is missing in the article receiving slots 50, 64 and/or the sectioned article retaining regions 146.

Figure 10:
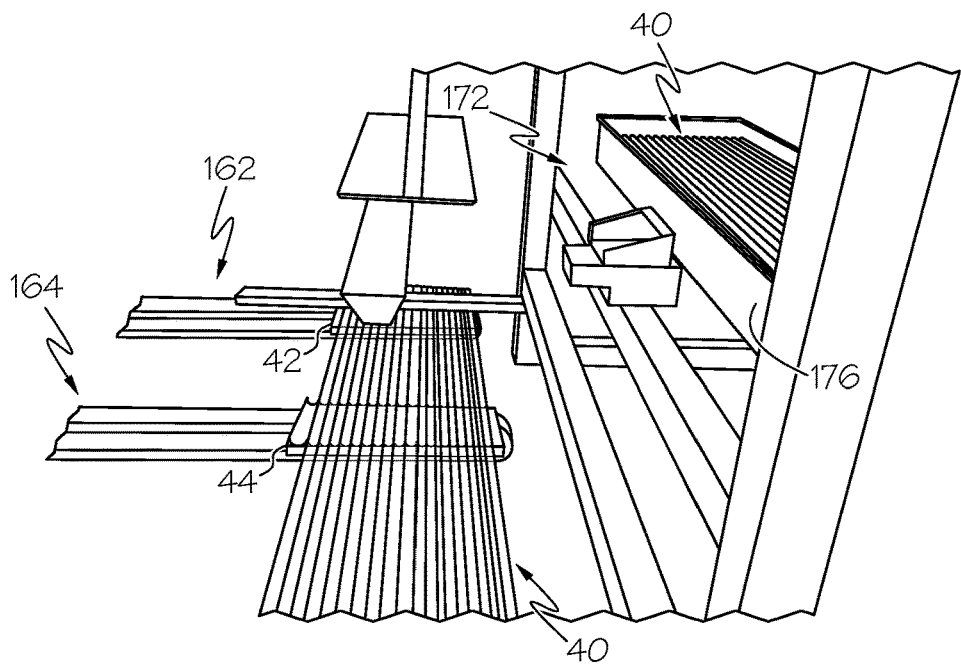
FIG. 10 illustrates a bundle building station of the packaging apparatus of FIG. 7, according to one or more embodiments shown and described herein.
Figure 11:
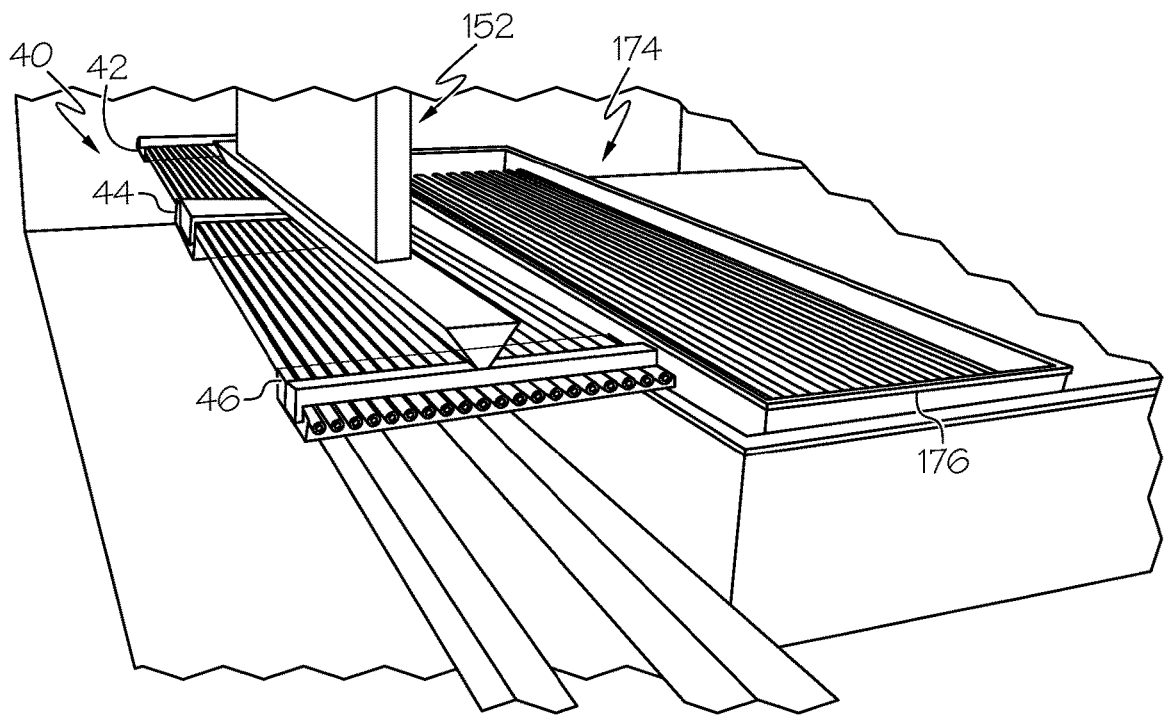
FIG. 11 illustrates another view of the bundle building station of the packaging apparatus of FIG. 7, according to one or more embodiments shown and described herein.

Referring to FIG. 10, once the layer separation inserts 42, 44 and 46 are filled, the glass article layer 40 may be moved along the conveying areas 162, 164 and 166 to a bundle building station 172. Referring also to FIG. 11, the robotic lift assembly 152 may be used to lift the glass article layer 40 and stack the glass article layers 40, one on top of another to form a bundle 174 within a shipping container 176, as opposed to wrapping as described above. In some embodiments, the bundle may both wrapped and placed in the shipping container 176. In some embodiments, the shipping container 176 may be wrapped in a plastic film.

Figure 12:
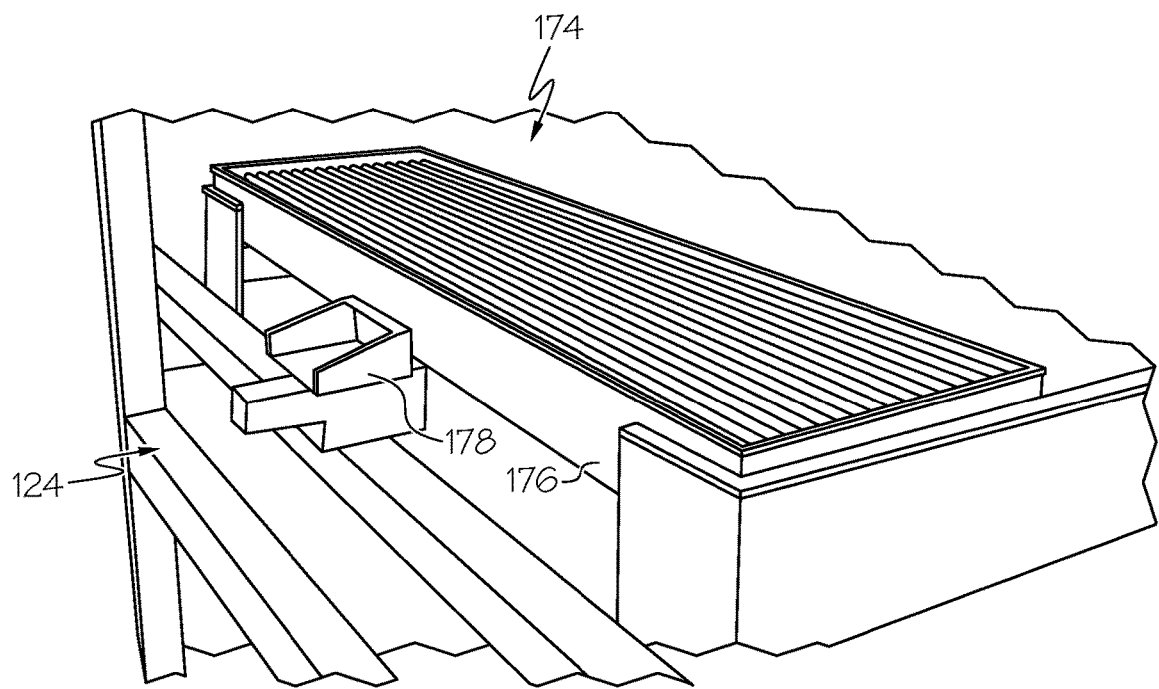
FIG. 12 illustrates another view of the bundle building station of the packaging apparatus of FIG. 7, according to one or more embodiments shown and described herein.
Figure 13:
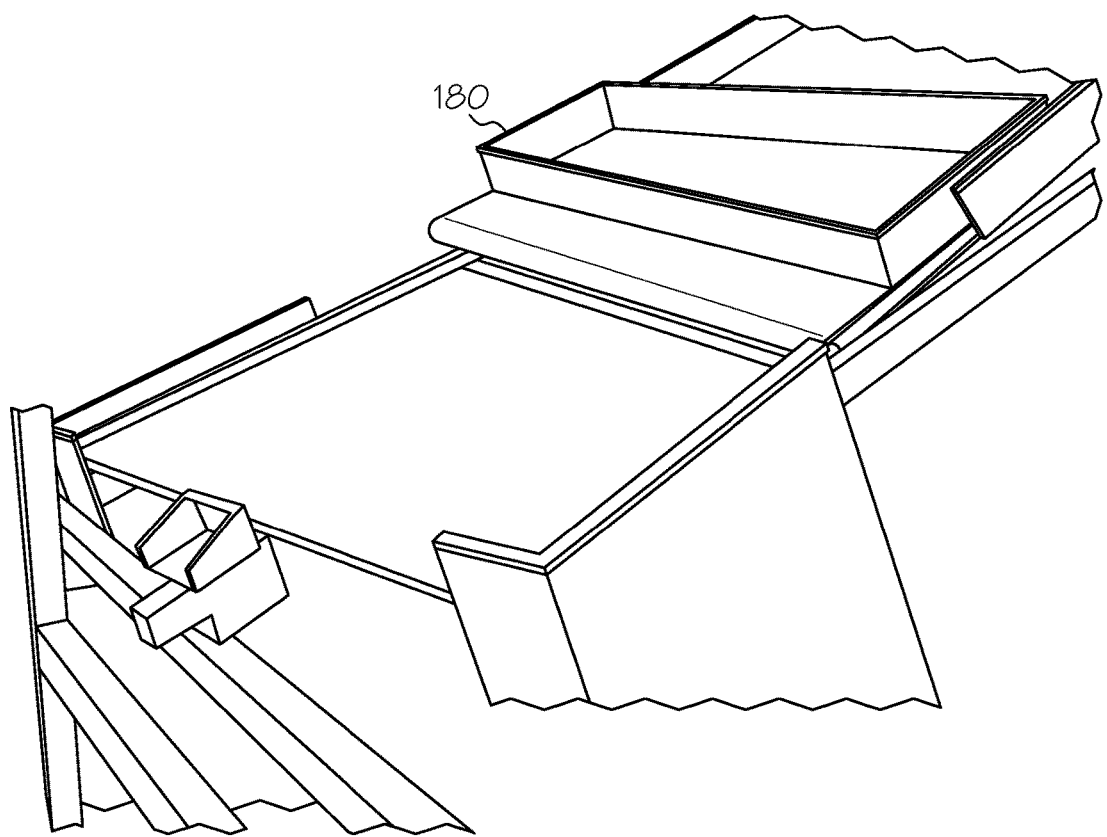
FIG. 13 illustrates another view of the bundle building station of the packaging apparatus of FIG. 7, according to one or more embodiments shown and described herein.
Figure 14:
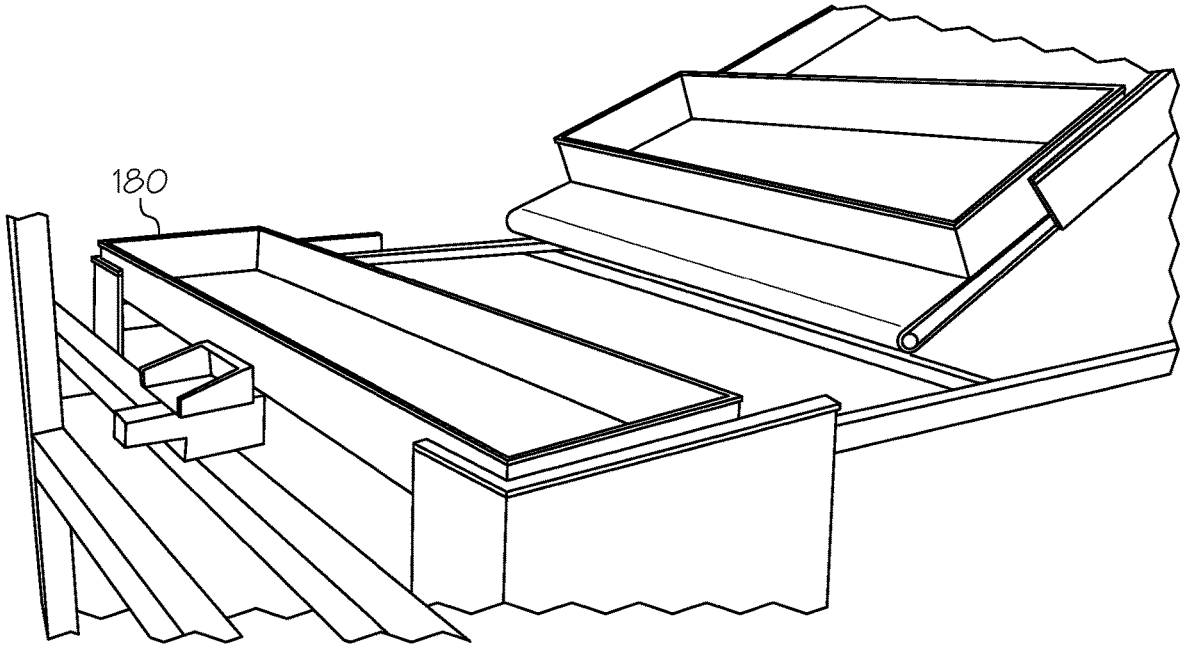
FIG. 14 illustrates another view of the bundle building station of the packaging apparatus of FIG. 7, according to one or more embodiments shown and described herein.

Referring to FIG. 12, the bundle 174 may be transported to a palletized package building station. For example, a pusher 178 of the conveying system 124 may be used to push the bundle 174 along with the shipping container 176 out of the bundle building station 172. Referring to FIG. 13, once the bundle 174 is removed, another empty shipping container 180 may be delivered to the bundle building station 172. FIG. 14 illustrates the shipping container 180 ready to be filled with glass article layers 40 including the layer separation inserts 42, 44 and 46.

Figure 15:
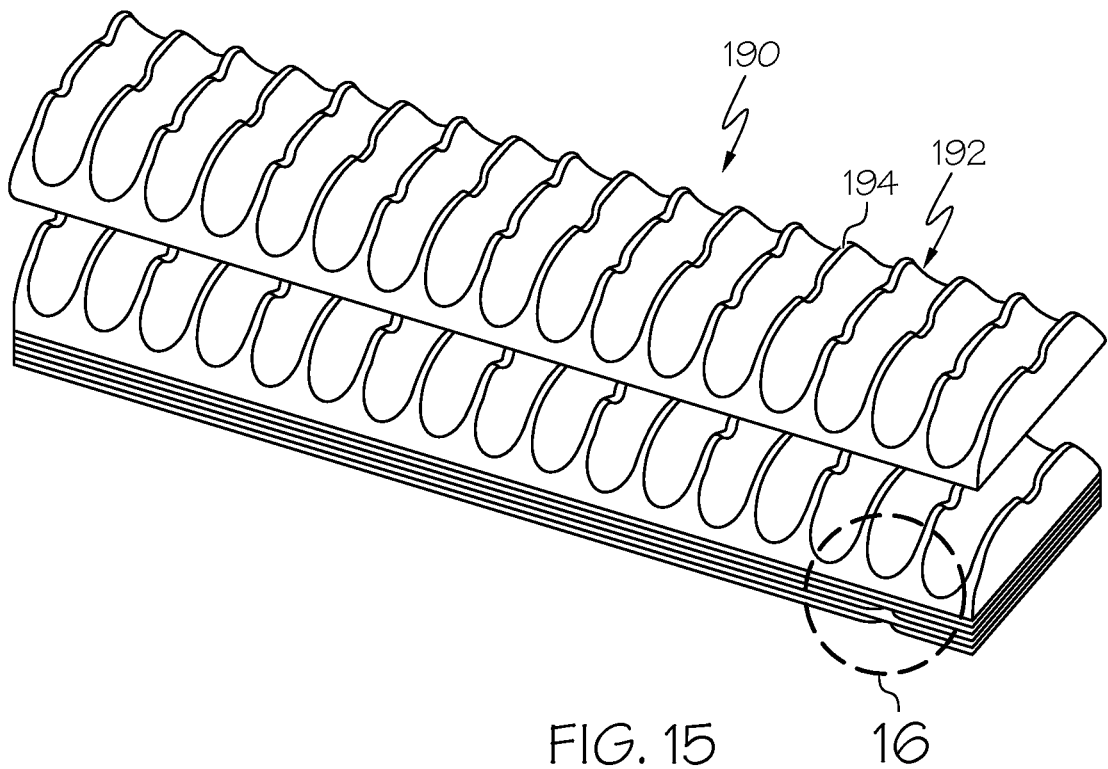
FIG. 15 illustrates another embodiment of a layer separation insert for building a glass article layer of glass articles, according to one or more embodiments shown and described herein.
Figure 16:
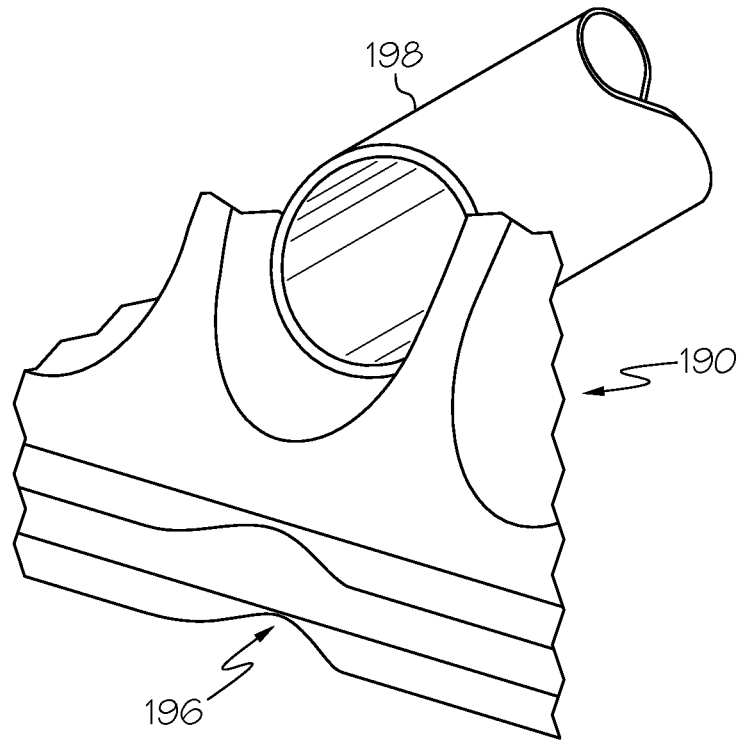
FIG. 16 is a detail view of the layer separation insert of FIG. 15 in a stacked orientation.

Referring to FIG. 15, while multiple layer separation inserts may be used for relatively long glass articles (e.g., about one meter or more), in some embodiments, an individual layer separation insert 190 may be used to support multiple glass articles. The layer separation insert 190 may include article receiving slots 192 that are sized to receive the glass articles therein. Side walls 194 may be provided that separate the article receiving slots 192 in a fashion similar to that described above. Referring to FIG. 16, in one orientation, the layer separation inserts 190 may be nestable. Rotated 180 degrees, the layer separation inserts 190 may only be stackable and not nestable. Various alignment features may be provided for the layer separation inserts 190, such as a trim notch 196 that can be used by a packaging apparatus in orienting the layer separation inserts 190. FIG. 16 illustrates a layer separation insert 190 with a glass article 198.

The above-described apparatuses and methods can be used to handle and package relatively large numbers of glass articles, while minimizing or even eliminating glass-to-glass contact or human contact with the glass articles. Such an arrangement can reduce potential glass article fracture sites (scratches, defects, chips, etc.), which can, in turn, improve strength of the glass articles and improve cleanliness. The apparatuses and methods may be used with or without shipping containers, such as boxes by wrapping the glass articles in a plastic film.

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

What is claimed is:

1. A method of forming bundles of glass articles, the method comprising:
   transporting individual glass articles to an insert building station using a conveying system, the conveying system comprising a continuous conveyor belt comprising sectioned article retaining regions that are each sized and configured to retain a single glass article spaced from adjacent glass articles in a conveying direction as the glass articles are transported to the insert building station;
   moving a layer separation insert to the insert building station using a conveyor different from the continuous conveyor belt;
   individually locating the glass articles within article receiving slots of the layer separation insert using the continuous conveyor belt and the conveyor, wherein each article receiving slot of the layer separation insert sequentially receives a single glass article that is released from a respective sectioned article retaining region of the continuous conveyor belt forming a glass article layer of side-by-side glass articles;
   moving the layer separation insert with the glass articles from the insert building station to a bundle building station using the conveyor once the layer separation insert is filled; and
   using a robotic lift assembly, removing the layer separation insert with the glass articles from the conveyor and stacking multiple glass article layers including layer separation inserts using the conveying system forming a bundle, the layer separation inserts providing a barrier between adjacent glass articles of each of the glass article layers.

2. The method of claim 1, wherein the glass articles are in the form of glass tubes, the method further comprising detecting if any of the article receiving slots are unfilled using a sensor before the step of moving the layer separation insert with the glass articles from the insert building station to the bundle building station.

3. The method of claim 2 further comprising individually locating the glass tubes in multiple layer separation inserts using the conveying system forming a glass article layer of side-by-side glass tubes.

4. The method of claim 1 further comprising wrapping the bundle with a plastic film.

5. The method of claim 1 further comprising forming the bundle within a shipping container.

6. The method of claim 1, wherein the layer separation inserts comprise sidewalls that separate adjacent slots.

7. An apparatus that forms bundles of glass articles, the apparatus comprising:
   a glass article infeed station that provides glass articles to a conveying system, the conveying system transports individual glass articles to an insert building station, the conveying system comprising a continuous conveyor belt comprising sectioned article retaining regions that are each sized and configured to retain a single glass article spaced from adjacent glass articles in a conveying direction as the glass articles are transported to the insert building station;
   an insert feed station comprising a plurality of layer separation inserts, the conveying system transports the plurality of layer separation inserts to the insert building station;
   the conveying system is configured to individually locate the glass articles within article receiving slots of the plurality of layer separation inserts using the continuous conveyor belt, wherein each article receiving slot of the plurality of layer separation inserts sequentially receives a single glass article that is released from a respective sectioned article retaining region of the continuous conveyor belt forming a glass article layer of side-by-side glass articles;
   a bundle building station where the conveying system stacks multiple glass article layers including layer separation inserts forming a bundle, the layer separation inserts providing a barrier between adjacent glass articles of each of the glass article layers;
   a conveyor different from the continuous conveyor belt that moves each one of the plurality of layer separation inserts from the insert building station to the bundle building station once each one of the plurality of layer separation inserts is filled; and
   a robotic lift assembly that removes each one of the plurality of layer separation inserts with the glass articles from the conveyor and stacks the multiple glass article layers.

8. The apparatus of claim 7, wherein the glass articles are in the form of glass tubes, the apparatus further comprising a sensor that is used to detect if any of the article receiving slots are unfilled before the conveyor moves each one of the plurality of separation inserts from the insert building station to the bundle building station.

9. The apparatus of claim 8, wherein the conveying system simultaneously transports multiple ones of the layer separation inserts to the insert building station, each glass article being received by slots of the multiple ones of the layer separation inserts forming the glass article layer of side-by-side glass tubes.

10. The apparatus of claim 7 further comprising a film supply and seal station that wraps the bundle with a plastic film.

11. The apparatus of claim 10 comprising a heating station that heats the plastic film.

12. The apparatus of claim 7, wherein the conveying system stacks the multiple glass article layers in a shipping container.

13. The apparatus of claim 7, wherein the plurality of layer separation inserts comprise sidewalls that separate adjacent slots.

14. The apparatus of claim 7, wherein the conveying system comprises a robotic lift assembly that stacks the multiple glass article layers.

15. A method of forming a palletized package of bundles of glass articles, the method comprising:
    building multiple glass article layers using a conveying system by individually locating the glass articles sequentially within article receiving slots of multiple layer separation inserts using a continuous conveyor belt, the continuous conveyor belt comprising sectioned article retaining regions that are each sized and configured to retain a single glass article spaced from adjacent glass articles in a conveying direction as the glass articles are transported by the conveying system, wherein each article receiving slot of the layer separation inserts sequentially receives a single glass article that is released from a respective section article retaining region forming glass article layers of side-by-side glass articles;

moving each layer separation insert with the glass articles from the insert building station to a bundle building station using a conveyor different from the continuous conveyor belt once each layer separation insert is filled;

using a robotic lift assembly, removing each layer separation insert from the conveyor and stacking multiple glass article layers including layer separation inserts using the conveying system forming multiple bundles at the bundle building station, the layer separation inserts providing a barrier between adjacent glass articles of each of the glass article layers; and stacking the multiple bundles forming the palletized package.

16. The method of claim 15, wherein the glass articles are in the form of glass tubes, the method further comprising detecting if any of the article receiving slots are unfilled before the step of moving each layer separation insert with the glass articles from the insert building station to the bundle building station using the conveyor.

17. The method of claim 15 further comprising wrapping the multiple bundles with a plastic film.

18. The method of claim 15 further comprising forming the multiple bundles within shipping containers.

19. The method of claim 15, wherein the layer separation inserts comprise sidewalls that separate adjacent slots.

* * * * *